L. E. DE MOLE.
ROAD VEHICLE.
APPLICATION FILED MAR. 4, 1920.
1,408,569.
Patented Mar. 7, 1922.
2 SHEETS—SHEET 1.
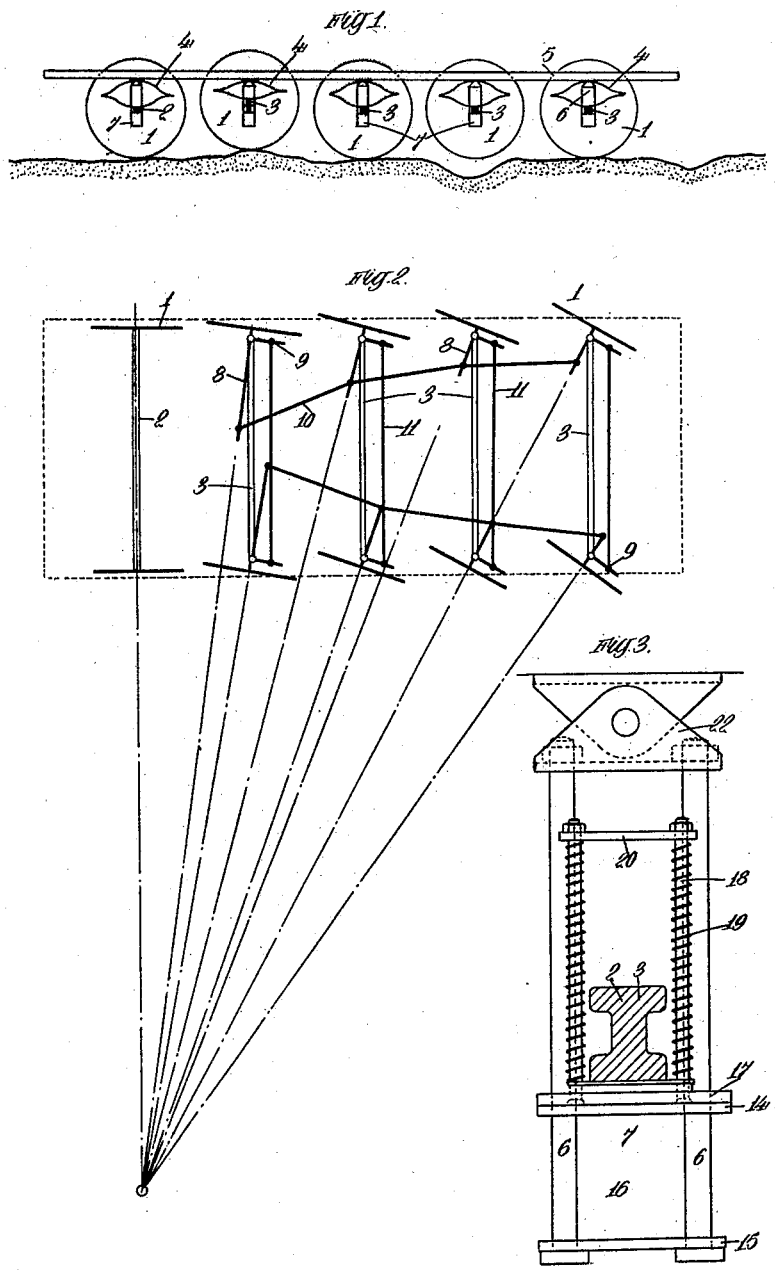

L. E. DE MOLE.
ROAD VEHICLE.
APPLICATION FILED MAR. 4, 1920.
1,408,569.
Patented Mar. 7, 1922.
2 SHEETS—SHEET 2.
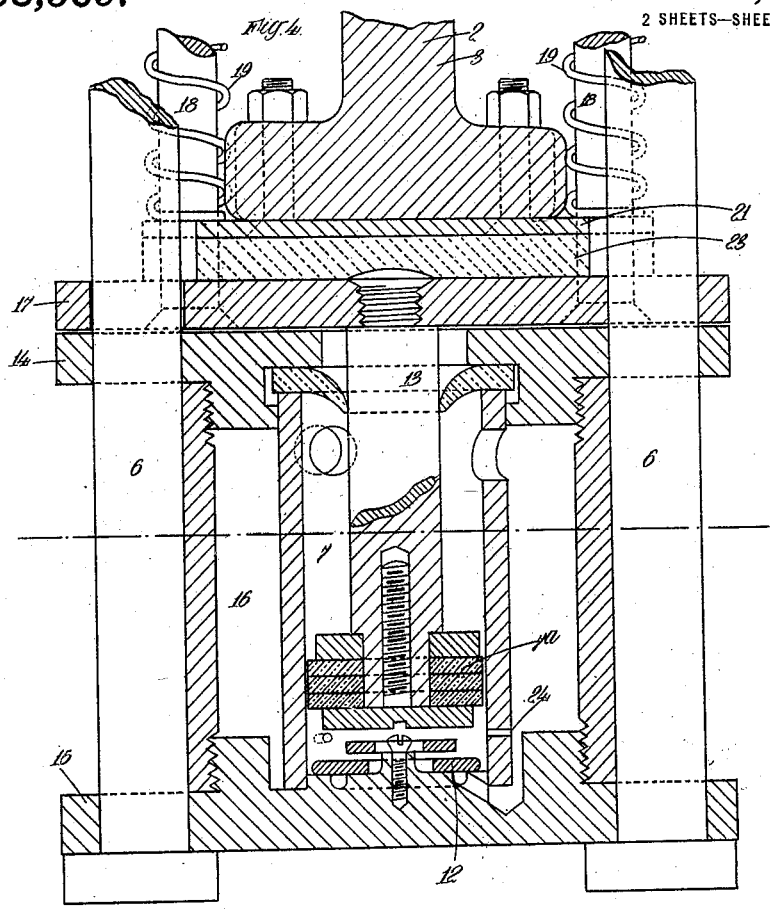
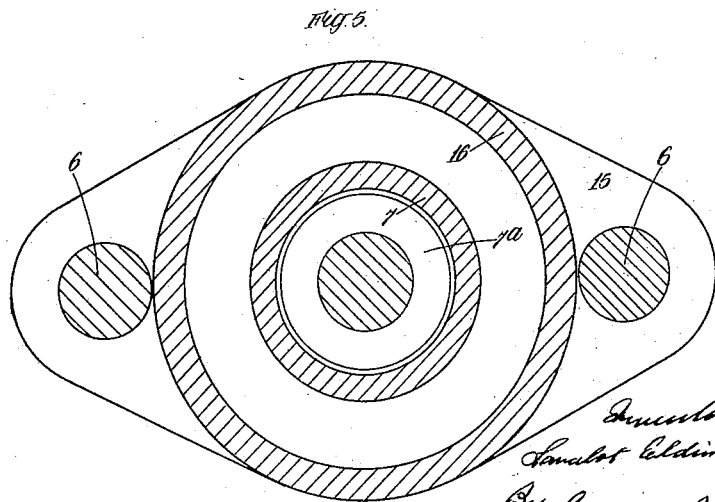

UNITED STATES PATENT OFFICE.

LANCELOT ELDIN DE MOLE, OF NORTH ADELAIDE, SOUTH AUSTRALIA, AUSTRALIA.

ROAD VEHICLE.

1,408,569. Specification of Letters Patent. Patented Mar. 7, 1922.

Application filed March 4, 1920. Serial No. 363,266.

*To all whom it may concern:*

Be it known that I, LANCELOT ELDIN DE MOLE, a citizen of the Commonwealth of Australia, residing at 79 Jeffcott Street, North Adelaide, State of South Australia, Commonwealth of Australia, have invented certain new and useful Improvements in Road Vehicles, of which the following is a specification.

This invention relates to improvements in motor road vehicles and has for its chief object to provide an improved construction of vehicle suitable for use over rough and uneven ground, in which jarring of the vehicle due to such ground is greatly reduced and the vehicle is not liable to become stranded or stuck in position because of one of its driving road-wheels losing contact with the road surface.

According to this invention the vehicle is provided with at least eight road wheels, four at each side, and means are provided for subjecting supporting springs associated with each wheel to a stress of the same order as that due to the normal load. The yielding of any spring will therefore begin only when its normal stress is exceeded, usually owing to shocks due to the ground, and when a wheel passes over a depression it cannot drop into it but is supported by its stressed spring and meets the ground at the other side without shock. For steering purposes all the wheels except the back pair are preferably employed and the connections between the steering gear and the wheels are so arranged as to increase the steering angle from the rear to the front set of steering wheels, causing all the wheel axes to radiate as nearly as possible from the centre of turning of the vehicle.

In order that the said invention may be clearly understood and readily carried into effect, the same will now be described more fully with reference to the accompanying drawings, in which:—

Figure 1 is a diagram showing one side of a ten wheel vehicle illustrating the method of controlling the action of the springs.

Figure 2 is a diagrammatic plan illustrating the method of steering.

Figure 3 is a detail view of the spring stressing device with a dash-pot used for damping the action of the springs, and Figures 4 and 5 are detail views of the dash-pot.

1, 1 are the road wheels mounted on the axles 2, 3, which axles are secured by suitable springs 4 to a framework 5 forming a chassis. 6, 6 are tie-backs or tie rods for stressing or compressing the springs and are provided with oil dash-pots 7. 8, 9 are steering arms with which the steering road wheels are provided, these arms being connected by links 10 and steering bars 11 to each other in the manner shown in Figure 2.

In the diagrams Figures 1 and 2 the vehicle is shown with ten road wheels mounted in pairs on their axles. The axle 2 for the back wheels is made in accordance with the usual practice for the back wheels of ordinary motor vehicles and the other axles 3 are jointed on the Ackerman principle so that the wheels may be deflected for steering purposes. Any or all of the road wheels 1 may be provided with driving gear so as to serve as driving wheels.

The tie-backs 6 subject the springs 4 to compression, the stress preferably exceeding that due to the normal load upon the spring with the result that a spring, or its corresponding wheel, does not yield until the load upon the wheel substantially exceeds the normal. The oil dash-pot 7 fitted to each tie-back damps any action of the spring and steadies the wheel. On any wheel passing over a hole or depression in the road surface, as indicated in Figure 1, it cannot descend into the hole owing to the tie-back but maintains substantially its normal position, its usual load being distributed among the other wheels which, owing to their number, keep the vehicle level. As the springs are stressed beyond their carrying load the excess load, due to one or more of the wheels being suspended momentarily, would not usually cause the springs to be compressed beyond their normal position so that one or more of the road wheels can be carried over a hole in the road without any appreciable vibration of the chassis due to the hole.

For steering purposes it is desirable that the angle through which the steering wheels are turned should increase towards the front and the wheels should turn so that their axes lie as near as possible on radii from the centre of turning of the vehicle, as shown in Figure 2. This is effected by providing the wheels with steering arms 8 which increase in length from the front to the rear steering wheels, which arms are connected together by links 10. The relative lengths of the arms 8 are chosen so as to give the desired relative turning angles to the wheels. The wheels are also provided with the second set of arms 9 arranged at an angle to the axles and connected together by steering bars 11 in the well known manner. In the diagram, Figure 2, the rear pair of wheels 1 are not steered but all the remaining wheels serve as steering wheels, with steering deflection increasing progressively to the front pair. For driving through any of the steering wheels the connections to the engine may include a pair of universal joints, one situated adjacent to the road wheel and the other to the driving member of the engine, the joints allowing for the steering deflection of the wheels while transmitting the power.

Referring to the tie-back and dash-pot arrangement shown in Figures 3, 4 and 5, the dash-pot 7 comprises a cylinder fitted with a plunger or piston 7a and provided at one end with a valve 12 and at the other end with a leather collar 13. The ends of the cylinder 7 meet the memberes 14 and 15 screwed into the ends of a cylinder 16 which acts as an oil reservoir. One end of the piston 7a is screwed and riveted to a guide plate 17 which is arranged to slide on the tie bolts 6. The plate 17 is provided with four bolts 18 around which are placed the spiral springs 19 held in compression between the top plate 20 and a lower plate 21 bolted to the axle 2 or 3.

The action of the dash-pot 7 is as follows:— When a very heavy wheel load causes the spring 4 to yield, the axle 2 or 3 leaves its normal position and draws the piston 7a upwards in the dash-pot 7, causing oil to flow through the valve 12 and fill the space under the piston. When the piston comes to the end of its stroke the top of the bolts 18 contact with the hanger 22 and if the axle is still rising; the plate 21 slides on the bolts 18 and compresses the springs 19. When the axle falls the plate 21 strikes the rubber buffer 23 and drives the piston into the cylinder, compressing the oil in the cylinder and causing it to squeeze past the piston (which should not fit tightly) and through relief holes 24 in the cylinder walls; so that the descent of the axle is steadied and no shock is felt on the chassis.

If desired a multi-wheel vehicle of eight or more wheels steered and fitted with tie-backs in accordance with this invention may be used as a trailer.

What I claim and desire to secure by Letters Patent of the United States is:—

1. In a road vehicle, at least four pairs of road wheels, separate vehicle supporting springs for the said wheels and means by which, independently of the weight carried by each wheel, its complete spring is subject to a permanent stress of the same order as that due to the normal load, whereby the wheel yields only when its normal stress is exceeded while if momentarily unsupported it is prevented from dropping and the weight it normally carries is taken up by the remaining wheels without appreciable displacement of the vehicle body.

2. In a road vehicle, at least four pairs of road wheels, separate vehicle supporting springs for the said wheels placed between the axles and the vehicle frame, tie rods for each wheel, carried by the frame, and means by which the said tie rods apply a stress to each of the aforesaid supporting springs, which stress is at least of the same order as that due to the normal load upon each spring, whereby the corresponding wheel yields only when its normal stress is exceeded while if momentarily unsupported it is prevented from dropping and the weight it normally carries is taken up by the remaining wheels without appreciable displacement of the vehicle body.

3. In a road vehicle, at least four pairs of road wheels, separate vehicle supporting springs for the said wheels, means by which, independently of the weight carried by each wheel, each complete spring is subjected to a permanent stress of the same order as that due to the normal load, whereby the wheel yields only when its normal stress is exceeded while if momentarily unsupported it is prevented from dropping and the weight it normally carries is taken up by the remaining wheels without appreciable displacement of the vehicle body, and a damping device connected to the said spring stressing means and adapted to reduce shock due to sudden action of the said stressing means.

4. In a road vehicle, at least four pairs of road wheels, separate vehicle supporting springs for the said wheels, means by which, independently of the weight carried by each wheel, each complete spring is subjected to a permanent stress of the same order as that due to the normal load, whereby the wheel yields only when its normal stress is exceeded while if momentarily unsupported it is prevented from dropping and the weight it normally carries is taken up by the remaining wheels without appreciable displacement of the vehicle body, and a dash-pot connected to the said stressing means comprising inner and outer communicating cylinders carried by the stressing means and a piston working in the inner cylinder and carried by the wheel axle.

LANCELOT ELDIN DE MOLE.